May 7, 1929.  J. W. SUMNER ET AL  1,712,057
DRIVE AXLE
Filed April 10, 1924  2 Sheets-Sheet 1

INVENTORS
JAMES WAYNE SUMNER
ALDEN G. RAYBURN.
BY White Prott Evans
ATTORNEYS.

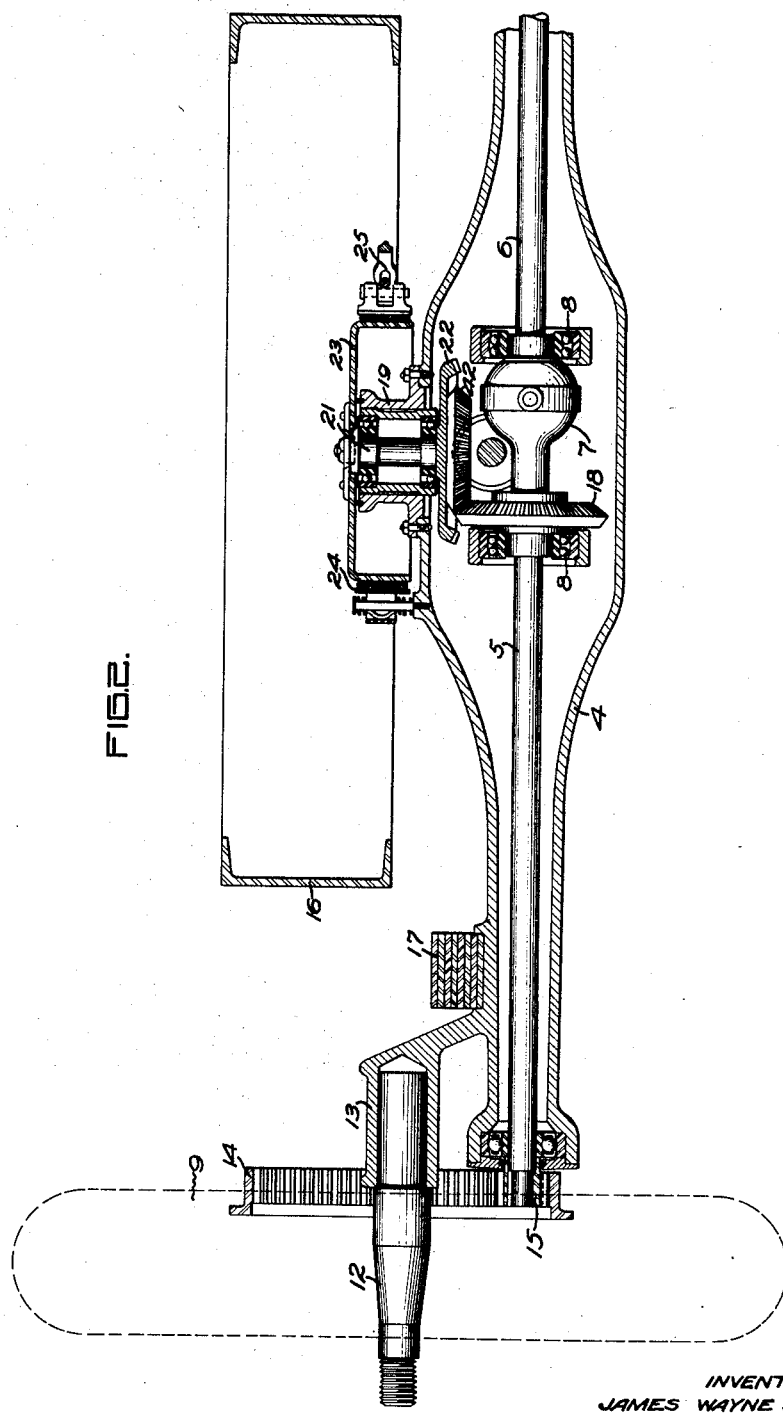

Patented May 7, 1929.

1,712,057

UNITED STATES PATENT OFFICE.

JAMES WAYNE SUMNER AND ALDEN G. RAYBURN, OF LOS ANGELES, CALIFORNIA, ASSIGNORS TO EMORY WINSHIP, OF SAN FRANCISCO, CALIFORNIA.

DRIVE AXLE.

Application filed April 10, 1924. Serial No. 705,476.

The invention relates to drive axles for vehicles and particularly to tandem axles in which the drive shaft extends through the front axle to the rear axle of the pair.

An object of the invention is to provide a tandem drive axle of simple and efficient construction.

Another object of the invention is to provide a through drive axle in which the parts are contained in a relatively small space, thus providing ample clearance between the axle housing and the road and between the axle housing and the vehicle body.

Another object of the invention is to provide a drive axle having a brake associated therewith, the brake being of sufficient dimensions to properly handle the weight of the vehicle and at the same time provide proper road clearance.

The invention possesses other advantageous features, some of which, with the foregoing, will be set forth at length in the following description, where we will outline in full that form of our invention which we have selected for illustration in the drawings accompanying and forming part of the present specification. In said drawings we have shown one form of drive axle embodying our invention, but it is to be understood that we do not limit ourselves to such form, since the invention, as set forth in the claims, may be embodied in a plurality of forms.

Referring to said drawings:

Figure 2 is a longitudinal vertical section through one of the axles.

Figure 1:
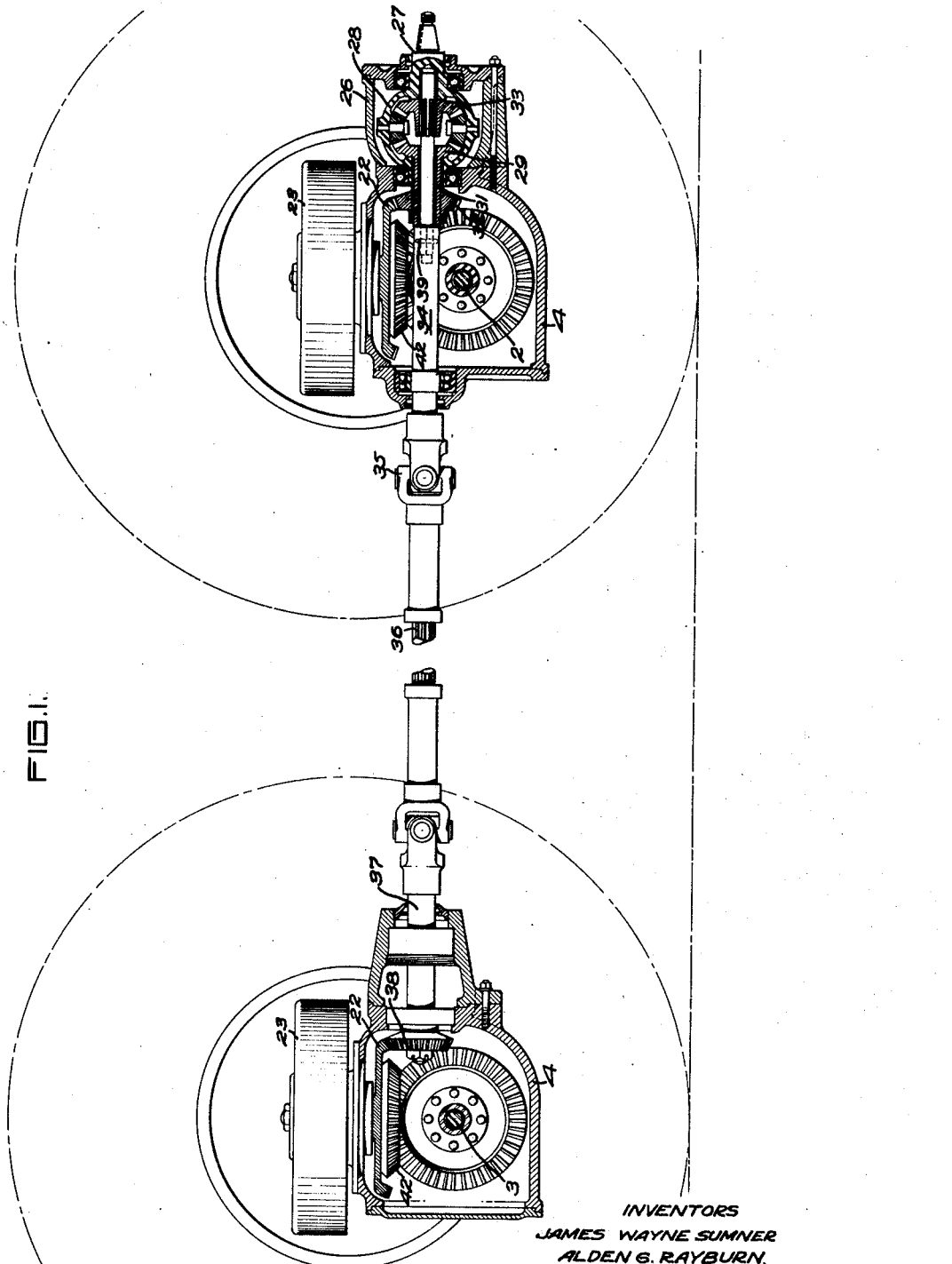
Figure 1 is a vertical cross section through a tandem axle embodying our invention.

The invention relates to tandem axles which are driven by a drive shaft which extends through the housing of the front axle to the rear axle and which is connected to the driving axle in the front and rear axles. The general structure of the two axles is substantially the same, with the exception that the drive shaft extends through the housing of the front axle. Each drive axle, that is, the front axle 2 and the rear axle 3, comprises a housing 4 in which the driving axle is disposed. The driving axle is ordinarily a two-part axle comprising the drive axle parts 5 and 6 and these parts are connected together by the usual differential which is enclosed in the differential housing 7. The differential housing is supported in bearings 8 which are arranged in brackets carried by the housing 4 and the axle parts 5 and 6 are driven by driving the differential housing 7. The driving axles 5 and 6 are connected to the wheels 9 in any desirable manner and in the drawings we have shown one form of connection which is advantageous on account of the large gear reduction produced thereby. The wheel 9 is carried on a spindle 12 which is secured to an upward extension 13 of the housing 4 so that the spindle 12 lies substantially in the same vertical plane as the driving axle 5. Secured to the wheel and concentric with the spindle 12 is an internal gear 14 which is engaged by a pinion 15 secured to the end of the driving axle. The housing 4 is connected to the vehicle frame 16 by springs 17.

The differential housing 7 is driven by the bevel gear 18 which is secured to the housing 7 and arranged concentrically with respect to the axis of the driving axle 5. Suitably journalled in a case 19 which is secured to the top of the housing 4 is a shaft 21 to the lower end of which is secured two bevel gears 22 and 42, of different diameters. The gears are preferably arranged in contact, so that the toothed faces of the gears are adjacent each other. The bevel gear 42 is in mesh with the bevel gear 18 on the differential housing, so that the shaft 21 is directly connected to the differential housing. The bevel gear 18 is vertically disposed and the bevel gears 42 and 22 are horizontally disposed, so that the shaft 21 is vertically disposed. Since the shaft 21 is directly connected to the differential housing, by providing means for retarding the speed of the shaft 21 an excellent brake is provided. The rotating member of the brake is secured to the shaft 21 and by providing means for retarding rotation of this member, the movement of the vehicle may be retarded. In the accompanying drawings we have shown a friction brake comprising the horizontally disposed brake drum 23 which is secured to the shaft 21. Surrounding the drum 23 is a brake band 24, which is suitably supported on the housing 4 and which is provided with means, such as the lever 25, for varying the friction of the band on the drum. By arranging the drum in a horizontal plane above the axle, it is possible to employ a drum of large diameter which permits very effective braking action. The drum extends only a short distance above the housing so that ample clearance is provided between the top of the drum and the vehicle body.

The drive shaft extends through the housing of the front axle 2 and into the housing of the rear axle 3 and bevel gears secured to the shaft mesh with the bevel gears 22 in the housing for the purpose of transmitting power to the driving axles. Instead of mounting the two bevel gears directly on the driving shaft, it is advisable to interpose a differential gear between the two bevel gears so that the two axles are differentially driven. For this purpose we have interposed a differential gear between the propeller shaft and the two gears which drive the horizontally disposed gears 22 in the respective axles. Mounted on the housing 4 of the front axle 2 is a housing 26 in which a differential gear is arranged. The propeller shaft 27 is connected to the differential housing 28 so that the housing rotates with the propeller shaft. One of the differential gears 29 is connected by means of the hollow shaft 31 with the bevel gear 32 which is in mesh with the horizontally disposed bevel gear 22 in the front axle. The other differential gear 33 is connected by the shaft 34 which is provided with universal joints 35 and a slip joint 36 to the driving shaft 37 of the rear axle. Secured to the driving shaft 37 is a bevel gear 38 which is in mesh with the horizontal bevel gear 22 in the rear axle. For the purpose of construction, the shaft 34 is formed in two parts, one part having a rectangular socket into which the rectangular end of the other part extends, the telescoping parts being secured together in a suitable manner such as by the pin 39. The shaft 34 extends through the front housing below the horizontal gear 42 and above the driving axle and extends backward in a substantially horizontal plane to the rear axle. By virtue of this arrangement, the angularity produced at the universal joints 35, due to spring action, is reduced to a minimum.

The driving gears 32 and 38 are preferably of smaller diameter than the gears 18 so that a speed reduction occurs in the axle. This speed is further reduced at the wheel. The gears 22 are also preferably of greater diameter than the gears 32 and 38, so that the speed of rotation of the brake drum is less than the speed of rotation of the propeller shaft, thereby reducing the wear on the brake band. The levers 25, which actuate the brakes, are preferably connected through a suitable equalizing device, with a hand lever which is operated by the driver so that both brakes may be simultaneously applied. By virtue of the arrangement of the parts in the axle, a very simple construction is provided which accomplishes a through drive with a minimum number of parts. Each axle is provided with a differential gear interposed between the axle parts and a differential gear is interposed between the two driving gears 32 and 38 so that each of the four driven wheels is differentially driven, thereby preventing undue wear of the tires as the vehicle departs from a straight course.

We claim:

1. A drive axle comprising a housing, a driving axle in said housing, a vertically disposed gear concentric with the driving axle and connected thereto, a horizontal gear engaging the vertical gear and disposed above the driving axle, a drive shaft extending through the housing between the horizontal gear and the driving axle, a second drive shaft differentially connected to the first drive shaft and a gear on the second drive shaft arranged to drive said horizontal gear.

2. A drive axle comprising a housing, a driving axle in said housing, a vertically disposed gear concentric with the driving axle and connected thereto, a horizontal gear engaging the vertical gear and disposed above the driving axle, a drive shaft extending through the housing between the horizontal gear and the driving axle, a hollow drive shaft surrounding the first drive shaft, a gear on the hollow shaft arranged to drive the horizontal gear and a differential gear interposed between the two drive shafts.

3. A drive axle comprising a housing, a driving shaft in said housing, a vertically disposed gear concentric with the driving shaft and connected thereto, a horizontal gear engaging the vertical gear and disposed above the driving shaft, a drive shaft extending through the housing between the horizontal gear and the driving shaft, a hollow drive shaft surrounding the first drive shaft, a gear on the hollow shaft arranged to drive the horizontal gear, a propeller shaft and a differential gear connecting the propeller shaft with the two drive shafts.

4. In combination, two spaced drive axles, each comprising a housing, a driving axle in each housing, a gear connected to and arranged concentrically with each driving axle, a horizontal spur tooth gear journalled in each housing and meshing respectively with said first gears, a drive shaft extending through the first housing into the second housing, a gear on said shaft arranged to drive the horizontal gear in the second housing, a drive shaft extending into the first housing, a gear on said latter drive shaft arranged to drive the horizontal gear in the first housing and a differential gear interposed between the two drive shafts.

5. In combination, two spaced drive axles, each comprising a housing, a two part driving axle in each housing, a differential gear including a differential housing interposed between the two drive axle parts in each housing, a gear secured to each differential housing, a horizontal gear in each housing meshing with the differential housing gear therein, a drive shaft extending through the first housing and into the second housing, a second horizontal gear in each housing secured to the first horizontal gear, a gear on said drive shaft engaging the second horizontal gear in the second housing, a second drive shaft extending into the first housing, a gear on the second drive shaft engaging the second horizontal gear in the first housing and differential gearing interposed between the two drive shafts.

6. A road vehicle including a pair of driven axles, each including a housing and a differential mechanism disposed therein, a propeller shaft, a through drive shaft extending between the axle housings and journalled therein for rotation about an axis located between the upper and lower limits of said axle housings, a driving pinion for the differential mechanism of each of said axles, a differential journalled in one of said axle housings for rotation about the same axis as said propeller and through drive shafts, said differential mechanism being operatively connected to said pinions to differentially drive them, a vertically disposed countershaft journalled in each housing, a gear on each of said countershafts meshing with the one of the pinions and further gearing between each counter-shaft and the differential mechanism individual to each axle for operating said differential mechanisms.

7. The combination defined in claim 6 in which each of said countershafts carries a horizontally disposed brake drum and in which each of said housings support brake bands designed for co-operation with said horizontally disposed drums.

8. A road vehicle comprising a pair of drive axles each including a housing and a differential mechanism, a pair of wheels for each axle disposed for rotation about an axis located substantially above the axis of rotation of the differential mechanism supported in each housing, means to cause each of said axles to drive each of said wheels at reduced speed, a propeller shaft, a through shaft extending between said housings and journalled therein for rotation about an axis located between the upper and lower limits of the axle housings and below the horizontal plane containing the axis of rotation of said wheels, gearing to operatively connect said propeller shaft and said through shaft to the differential mechanisms within said housings, said gearing including a pair of horizontally disposed gears secured to a countershaft journalled for rotation about a vertical axis in each of said housings.

9. The combination defined in claim 8 in which each of said countershafts is provided with a horizontally disposed brake drum located relatively close to the horizontal plane containing the axis of rotation of said wheels.

10. A road vehicle comprising a drive axle including a housing, a pair of wheels for said axle journalled therein for rotation about an axis located substantially above the axis of rotation of the differential mechanism supported in said housing, means operatively connecting said axle with each of said wheels, a propeller shaft journalled in said housing for rotation about an axis located between the upper and lower limits of the axle housing and below the horizontal plane containing the axes of rotation of said wheels, gearing to operatively connect said propeller shaft and said differential mechanism, said gearing including a pair of horizontally disposed gears secured to a countershaft journalled for rotation in said housing and a horizontally disposed brake drum secured to said countershaft and disposed above said housing but relatively close to said horizontal plane.

In testimony whereof, we have hereunto set our hands.

JAMES WAYNE SUMNER.
ALDEN G. RAYBURN.